United States Patent [19]

Fraser

[11] 4,244,604

[45] Jan. 13, 1981

[54] IMAGE-OFFSETTING

[75] Inventor: William J. Fraser, Forrest Lake, Minn.

[73] Assignee: Minnesota Mining and Manufacturing Company, Saint Paul, Minn.

[21] Appl. No.: 41,556

[22] Filed: May 23, 1979

[51] Int. Cl.[3] .................... B41M 5/16; B41M 5/22; C09D 11/00

[52] U.S. Cl. .................... 282/27.5; 106/14.5; 106/21; 427/150; 428/307; 428/537; 428/914; 564/77; 564/149

[58] Field of Search .................... 106/21, 14.5, 19, 20; 260/559 A, 559 H; 282/27.5; 427/150, 151; 428/307, 411, 537, 913, 914

[56] References Cited

U.S. PATENT DOCUMENTS

| | | | |
|---|---|---|---|
| 3,244,550 | 4/1966 | Farnham et al. | 117/36.2 |
| 3,411,976 | 11/1968 | Meliker et al. | 161/5 |
| 3,481,759 | 12/1969 | Ostlie | 282/27.5 |
| 3,547,646 | 12/1970 | Hori et al. | 260/559 H |
| 3,809,668 | 5/1974 | Yarian | 260/30.6 R |
| 3,852,094 | 12/1974 | Yarian | 282/27.5 |
| 4,101,690 | 7/1978 | Miyamoto et al. | 282/27.5 |
| 4,111,462 | 9/1978 | Lange et al. | 282/27.5 |
| 4,125,636 | 11/1978 | Kamio et al. | 427/150 |

OTHER PUBLICATIONS

Sacconi, J.A.C.S., 75, 5434 (11-5-53).

Moller, Carl R., Chemistry of Organic Compounds, 233-234 (1951).

*Primary Examiner*—Bruce H. Hess

*Attorney, Agent, or Firm*—Cruzan Alexander; Donald M. Sell; Jennie L. Giese

[57] ABSTRACT

A composition capable of reducing image-offset when used in combination with color-forming compounds which are capable of forming colored images with color-developing coreactants. The composition comprises an aliphatic tertiary amine image-offset control agent. Color-forming compounds such as dithiooxamide, dithiooxamide derivatives and certain aromatic substituted hydrazones, may also be included in the composition. The invention when employed in the art of carbonless paper enables the production of dark, black images in areas of a paper substrate containing color-forming compositions and transition metal color-developing compositions, without image-offsetting in areas not containing both the color-forming compound and the color-developing compound, even upon stacking color-forming compound containing sheets on top of color-developing compound containing sheets.

16 Claims, No Drawings

IMAGE-OFFSETTING

The present invention relates to the manufacture of carbonless forms and records using dithiooxamide (DTO) color-forming compounds. More specifically, the invention relates to means for preventing the undesirable transfer or "image offsetting" of DTO from the surface of various substrates to which it has been applied. Prevention of image offsetting is accomplished by adding an aliphatic tertiary amine to the DTO-containing color-forming composition.

Carbonless forms and records have been widely used in the area of multiply business forms and other record forms for a number of years. In the carbonless form, one surface of a sheet may contain a color-forming compound, e.g. DTO, while a second sheet may have on one surface a second, coreactant, color-forming compound, e.g. a transition metal salt such as a nickel salt. When the first compound is brought into contact with the second compound a complex is formed which has a color distinct from the color, if any, of the individual coreactants. Generally, one of the compounds, such as DTO, is carried in a liquid cosolvent vehicle (a vehicle which is a solvent for all of the compounds involved in the color-forming reaction), to facilitate transfer and complexing of the color-forming compounds.

In one known application of this technology, a first color-forming composition, e.g. containing DTO, is transferred from a ribbon by impact printing techniques to a record sheet which carries on selected portions of its surface a second color-forming composition, e.g. containing a transition metal salt. Visible images will appear on the portions of the record sheet where the first color-forming composition contacts the second color-forming composition whereas no visible images will appear in areas which do not contain the second composition even though the first composition has been transferred by impact thereto, e.g. for the purpose of causing image formation in an underlying sheet.

The techniques described above have been used successfully to eliminate the need for carbon transfer sheets in the preparation of previously known pre-stuffed envelope assemblies such as are shown in U.S. Pat. Nos. 3,104,799; 3,777,971; 3,830,141 and 3,988,971. By employing carbonless chemistry and techniques, information can be selectively printed on the front of the pre-stuffed envelope assembly while simultaneously selectively transferring additional information to one or more of the inserts within the envelope without this additional information appearing on the front of the envelope. This can be accomplished without the use of the conventional throw-away carbon transfer sheet by employing an envelope which has the front surface coated in selected areas with a color-forming composition and by using a transfer ribbon containing a color-forming coreactant composition. As the envelope passes through the printer the information, such as the address, applied to the front surface coated areas will be made visible due to the colored complex formed by the coating and the coreactant material in the transfer ribbon. However, information printed on the uncoated areas will not appear on the front surface of the envelope due to the absence of the coreactive coating in these areas. By this method, both the information appearing on the outside of the envelope and the information to be transferred to the interior may be printed in a single pass through the printer without causing the information appearing on the interior of the envelope to appear on the outer sheet of the envelope.

While the use of the carbonless chemistry can be advantageous, one problem encountered with carbonless systems wherein a DTO-containing composition is used is the problem of image offset. This occurs, for example, when printed carbonless sheets, such as pre-stuffed envelopes, are stocked for storage or handling and wherein areas carrying uncomplexed DTO are adjacent areas having a coreactant color-forming composition, such as a transition metal salt, thereon. Under these circumstances, DTO can volatilize and be transferred in the vapor phase to the adjacent coreactant containing sheet. Once there, DTO will complex with the coreactant to form a colored image or mark. Obviously, image offsetting is undesirable because images are formed where no DTO was applied and where no image formation was intended.

The problem of image offset has been overcome by the present invention through the use of an aliphatic, tertiary amine in combination with DTO in a color-forming composition. While the exact mechanism is not fully understood, it is believed that the aliphatic tertiary amine forms a product with the DTO which has a significantly lower volatility than the DTO alone. The DTO/amine product so formed does not, however, inhibit the DTO from forming colored complexes in the presence of transition metal ions, such as nickel. The DTO/amine combinations of the present invention can be used alone or in combination with other color-forming compounds, in a suitable cosolvent vehicle, to provide a variety of improved carbonless products, such as transfer ribbons and pads.

One aspect of the invention relates to color-forming compositions containing DTO and aliphatic tertiary amines in a cosolvent vehicle, which compositions exhibit reduced image offset.

Another aspect of the invention relates to transfer articles, such as transfer ribbons and transfer pads containing these improved imaging compositions.

Yet another aspect of the invention relates to substrates such as record sheets, transfer sheets and carbonless forms and the like, prepared by the use of the imaging compositions described herein.

The carbonless systems of the present invention having reduced image off-setting comprise carriers having two distinct complementary compositions which when brought into contact in a cosolvent vehicle, will complex to form colored compositions having a color distinctly different from that of either of the compositions individually.

One of the compounds used in such a color producing reaction will herein be termed a color-forming agent, and the other compound a color-developer. The color-forming agent is usually carried on a typewritter or computer ribbon in an appropriate cosolvent. The color-developer is carried as a coating on a paper substrate or is incorporated within the paper web of the substrate. Alternatively, the color-former could be coated on or contained within the paper and the color-developer could be carried on the ribbon. It is to be understood that these terms are interchangeable with respect to such compounds, and will be used for convenience only.

The color-forming composition comprises even more color-forming components which will complex with transition metal ions (the color-developer) to form colored complexes.

The color-forming components which will form complexes with transition metal salts are dithiooxamide (DTO), the N,N'-diorgano substituted derivatives such as N,N'-di-benzyl dithiooxamide (DBDTO) and N,N'-dioctanoyl oxyethyl dithiooxamide (DOEDTO), aromatic substituted hydrazones and mixtures thereof.

The aromatic substituted hydrazones which can be used in the practice of the present invention have the general formula

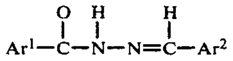

wherein $Ar^1$ and $Ar^2$ are independently selected aromatic substituents selected from the group of aromatic substituents consisting of phenyl, substituted phenyl and substituted naphthyl and wherein $Ar^2$ is selected from the group consisting of o-hydroxy phenyl, substituted o-hydroxy phenyl and o-hydroxy naphthyl. It is necessary for proper functioning of the hydrazones that the $Ar^2$ group bear a hydroxyl group substituent adjacent (ortho) to the site of attachment of the carbon atom attached by a double bond to the nitrogen atom.

The preferred hydrazones have one of the following three pairs of aromatic substituents $Ar^1$ and $Ar^2$:

(1) $Ar^1$ is an aromatic radical having the structure

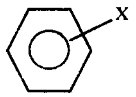

wherein X is selected from the group consisting of H; $CH_3$; p-(t-$C_4H_9$);o-OH; p-OH; o-Cl; o-$NH_2$; p-$NH_2$; m-$NO_2$; p-$NO_2$; and m-$CH_3$; o-OH; and $Ar^2$ is an o-hydroxy aromatic radical having the structure

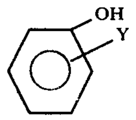

wherein Y is selected from the group consisting of H; 5-$NO_2$; 5-Cl; 3-$CH_3O$; and 3-$C_2H_5O$.

(2) $Ar^1$ is an aromatic radical having the structure

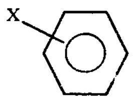

wherein X is selected from the group consisting of H; p-$CH_3$; p-(t-$C_4H_9$); and o-$NH_2$; and $Ar^2$ is an o-hydroxy aromatic radical having the structure

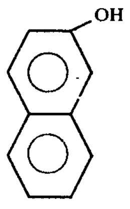

(3) $Ar^1$ is an aromatic radical having the structure

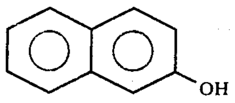

and $Ar^2$ is an o-hydroxy aromatic radical having the structure

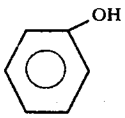

Particularly preferred substituted aromatic hydrazones are 2-hydroxy-1-naphthaldehyde-p-(t-butyl)-benzoyl hydrazone and 2-hydroxy-1-naphthaldehyde-o-aminobenzoyl hydrazone.

These aromatic substituted hydrazones are described and discussed in greater detail in commonly assigned copending application Ser. No. 41,693, entitled "Imaging Composition", filed of even date herewith.

The DTO compounds complex with transition metal ions, such as nickel, to form blue-purple complexes while the hydrazones form yellow complexes. Mixtures of the DTO-based compounds and the hydrazone can be used to provide black complexing compositions.

It is an important feature of the present invention that the liquid employed as the cosolvent for the DTO color-forming composition be a solvent for the transition metal salt color-developer as well. This same solvent then serves as a reaction medium for the formation of the DTO/metal imaging complex. As examples of solvents which fulfill the above criteria, mention may be made of cyclohexane, tributyl phosphate, diethyl phalate, toluene, xylene and 3-heptanone. The selection of additional suitable solvents will be obvious to those skilled in the art. Additionally, any hydrazone or DTO derivative employed in the color-forming composition must also be soluble in the chosen solvent.

The color-developing composition comprises the transition metal salts of organic or inorganic acids. The preferred transition metal salts are the nickel salts, although copper, iron and other transition metals can be used to advantage. Inorganic acids which can be used to form the transition metal salts are acids which will provide salts with transition metals which dissociate to provide the transition metal for the color-forming reaction. Exemplary inorganic acids are nitric acid, sulfuric acid, hydrochloric acid and the like.

The organic acids which are useful in forming the transition metal salts of the present invention are the aliphatic and aromatic mono- and di- carboxylic acids, substituted aliphatic and aromatic monocarboxylic acids, and heterocyclic monocarboxylic acids. Monocarboxylic aliphatic acids containing about 6 to 10 carbon atoms are preferred. Nickel 2-ethylhexoate is a particularly preferred color-forming transition metal salt. Other representative transition metal salts are the nickel, iron and copper salts of organic acids such as nickel rosinate, nickel calcium rosinate, nickel stearate, nickel 2-phenylbutyrate, nickel oleate, nickel benzoate and nickel hydrocinnamate as well as the corresponding copper and iron salts of the above compounds and mixtures of these compounds.

These CF compositions may be coated on substrates by conventional coating techniques known in the art or may be formulated into printing compositions and printed on all or a portion of a paper substrate. See, for example, U.S. Pat. No. 4,111,462 entitled "Latent, Sensitizing Ink".

A preferred embodiment of the present invention is a composition comprising an effective amount of the aliphatic tertiary amine and the color-forming coreactant comprising DTO, DBDTO, DOEDTO, and a preferred aromatic substituted hydrazone, dissolved in an organic reaction implementing cosolvent and carried on a typewriter or computer ribbon. The coreactant color-developer transition metal salt is coated on or contained in the web of a paper substrate. When used in a computer-controlled printing assembly, in response to imputs from a computer, the paper substrate is moved into a position adjacent to the ribbon and type characters force the ribbon into impact contact with the substrate. The ribbon is mounted on and conventionally driven between spools to provide a fresh portion of the ribbon surface for successive impacts.

The typewriter or computer ribbon must be of a material capable of withstanding the impact forces of the printing device, and may be similar to those materials now used in commercial applications, including woven matrices of nylon, rayon, cotton, or various combinations of natural and synthetic fibers. If desired, and if the application permits, the ribbon may be a polyester film, or other film, such as Mylar, for example.

In the preferred embodiment, the ribbon is saturated with a solution of color-former and aliphatic tertiary amine dissolved in a cosolvent. Alternatively, the aliphatic tertiary amine could be contained on portions of the paper substrate not having the color-developer contained thereon. In this manner, unreacted DTO applied to these areas would not transfer or image-offset to areas of adjacent substrates containing the color-developer.

Preferred aliphatic tertiary amines useful in the practice of the present invention are trilaurylamine and tributyl amine. The particularly preferred image-offsetting compound is trilaurylamine. The actual manner in which trilaurylamine reacts with DTO transferred to the paper substrate to prevent image-offset is not clearly understood. While DTO readily reacts with many transition metal salts in the presence of the reaction implementing cosolvent to form stable imaging complex compounds, trilaurylamine forms only a loose association with DTO. Therefor, when a mixture of DTO and a preferred aliphatic tertiary amine dissolved in a cosolvent is transferred to areas of a paper substrate containing a transition metal salt, the DTO will react with the metal salt to form colored images. When the DTO-amine mixture is transferred to portions of a paper substrate not containing a color-developer no images will be formed and a major portion of the reaction implementing cosolvent will be absorbed by the paper. However, even in the absence of the reaction implementing cosolvent vehicle unreacted DTO when applied on paper in a solution will volatilize and migrate from one surface to another. The volatilization and migration of DTO is minimized by practice of the invention since the aliphatic tertiary amine forms a loose association with DTO and thereby lowers the vapor pressure of the DTO.

As the computer printer of the preferred embodiment impacts against a computer ribbon containing the color-former, DTO and amine carried in the cosolvent, and transfers the color-former onto a paper substrate containing a transition metal salt color-developer, images are produced where the color-developer is present to complex with the DTO. Additionally, in areas of the paper not containing the color-developer but where the computer printer is impacting the ribbon against the paper, the color-former is transferred to the paper but remains invisible because no DTO-metal complex is being formed. As the DTO-amine cosolvent is absorbed into the substrate paper the amine forms a loose association with the unreacted DTO and causes the DTO to become insoluble and non-reactive with any metal it may subsequently come in contact with. The DTO-amine association reduces the vapor pressure of the unreacted DTO contained on the paper substrate and prevents it from migrating to adjacent metal containing surfaces and resulting in undesirable image formation or image-offsetting. Thus, image-offsetting will not occur even in multiple envelope assemblies printed according to the present invention and stored in zig-zag folded fashion, one on top of the other.

The amount of aliphatic tertiary amine effective in reducing image-offsetting is dependent upon the concentration of DTO. Generally, for a commercial product wherein the amine is incorporated in the color-forming composition on the carrier, about 2.5–20 moles of the aliphatic tertiary amine per mole of DTO is preferred. Particularly preferred concentrations range from about 5–15 moles of amine per mole of DTO. Concentrations of amine lower than the above produce minimal reduction of image-offsetting. Concentrations of amine higher than the above result in poor imaging because higher concentrations of amine in the color-forming compositions necessarily result in lower concentrations of the DTO color-former coreactant. If the amine is not incorporated into the color-forming composition but is contained on the paper substrate, there is no upper limit to the amount of amine effective in reducing image-offset, yet allowing acceptable image formation.

While the preferred embodiment of the present invention employs DTO color-former and the aliphatic tertiary amine dissolved in a cosolvent and contained on a ribbon, other manners of applying the color-former and the image-offset control agent to substrates containing the color-developer will be obvious to those skilled in the art and not beyond the scope of this invention. The color-former and control agent could be dispensed from a flow pen or other source. Alternatively, the color-former and control agent chemistry can be contained in a transfer medium such as a pad and transferred to a substrate at least partially coated with the color-developer in image-defining patterns. The transfer element could be a stamp or a portion of the human body such as a finger, palm, toe, foot, or the like. In this way printed images, fingerprints and the like may be obtained.

Additionally, the color-former and image-offset control agent could be contained on a paper sheet which is placed adjacent to a substrate containing color-developer in selected areas, and the two sheets brought into contact by printing or writing means.

As previously mentioned, it is not required that the amine image-offset control agent be contained on the same substrate as the color-former in order for image-offsetting to be prevented. The amine could be contained on the color-developer containing paper substrate, in areas not coated with the color-developer.

In yet another embodiment, the image-offset control agents of the present invention can be utilized in combination with pressure releasable encapsulated color-forming compositions. The preferred materials for microencapsulation of DTO containing color-forming compositions are gelatin or complexes of gelatin and gum arabic, although other gelatable hydrophilic colloids will do. Because the amine image-offset control agents cannot be encapsulated by the above means, the image-offset control agent must be applied as an overcoating of the amine in a cosolvent. For example, a conventional color-forming composition carrier, such as a ribbon, having color-forming compound, such as DTO, etc., in a cosolvent encapsulated in pressure rupturable capsules and adhered to the surface, can be overcoated with a combination of the amine image-offset control agent in cosolvent. Paper sheets impacted with this ribbon will exhibit significantly reduced image-offset when subsequently brought in contact with complementary color-developing substrates compared to a ribbon not having the image-offset control agent.

As noted hereinabove, when the color-forming compositions of the present invention are used in various transfer medium and transferred to substrates carrying color-developer in selected areas, image-offset is significantly reduced in areas where no image formation is intended. Areas of the substrate not containing both color-forming coreactants will remain colorless and will not be soiled by imaging materials that have offset to these areas.

In order to provide a specific illustration of the preparation of DTO and color-control agent containing ribbons, two examples will be considered. These will illustrate the specific compositions of two particular typewriter tapes and the amount of image-offsetting that is eliminated by their use.

EXAMPLE 1

A color-forming composition having reduced image-offset properties was prepared by admixing 2.98 gms. (0.0065 moles) of N,N'-dioctanoyl oxethyl dithiooxamide; 1.94 gms. (0.0065 moles) of N,N'-di-benzyl dithiooxamide; 0.65 gms. (0.0054 moles) of dithiooxamide; 0.65 gms. (0.0019 moles) of 2-OH-1-naphthaldehyde-p-(t-butyl)benzoyl hydrazone; 14.0 gms. (0.0271 moles) of trilaurylamine; and 28.0 gms. (0.105 moles) of tributyl phosphate. The above color-forming mixture was dissolved into solution with stirring at a temperature of 120° F. for 30 minutes on a steam bath.

Upon cooling enough solution was used to saturate a 5 mil. thick nylon cloth 4" by 6" to a coat weight of 0.100 gms. This sample was placed in a typewriter along with a sheet of plain forms bond paper, containing no nickel color-developer compound. After depositing invisible color-forming composition on the paper by impacting, the paper was removed and interfaced with a sheet of paper coated with a color-developing composition containing nickel-2-ethylhexoate. The two sheets remained in contact for a 24-hour period. Separated, the sheet containing the nickel color-developer compound showed only very slight image off-setting.

A control prepared according to the above formulation, but without the trilaurylamine image-offset control agent exhibited significant image-offsetting when tested under the same conditions.

EXAMPLE 2

A composition similar to that of Example 1 was prepared using a higher level of trilaurylamine addording to the following formulation: 2.98 gms. (0.0065 moles) of N,N'-dioctanoyl oxyethyl dithiooxamide; 1.94 gms. (0.0065 moles) of N,N'-di-benzyl dithiooxamide; 0.65 gms. (0.0054 moles) of dithiooxamide; 0.65 gms. (0.0019 moles) of 2-OH-1-naphthaldehyde-p-(t-butyl)benzoyl hydrazone; 42.0 gms. (0.0806 moles) trilaurylamine; and 15.0 gms. (0.0563 moles) of tributyl phosphate.

When tested as in Example 1, image-offset was significantly reduced compared with the control.

What is claimed is:

1. A color-forming composition comprising a dithiooxamide containing color-forming compound capable of forming colored complexes with transition metal salts and a liquid cosolvent vehicle, wherein the improvement comprises an image-offset control agent in an amount sufficient to reduce image-offsetting, said image-offset control agent being an aliphatic tertiary amine selected from the group consisting of trilaurylamine, tributyl amine, and mixtures thereof, which is capable of forming an association with color-forming dithiooxamide compound.

2. A color-forming composition according to claim 1 wherein said color-forming composition comprises about 2.5–20.0 moles aliphatic tertiary amine per 1.0 moles dithiooxamide color-forming compound.

3. A color-forming composition according to claim 1 wherein said color-forming compound a dithiooxamide derivative selected from the group consisting of N,N'-dibenzyl dithiooxamide, N,N'-dioctanoyl oxyethyl dithiooxamide, and mixtures thereof.

4. A color-forming composition according to claim 1 wherein said composition additionally comprises an aromatic substituted hydrazone

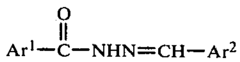

wherein $Ar^1$ is selected from the group of aromatic substituents consisting of phenyl, substituted phenyl and substituted naphthyl, and $Ar^2$ is selected from the group of aromatic substituents consisting of o-hydroxy phenyl, substituted o-hydroxy phenyl and o-hydroxy naphthyl.

5. A color-forming composition according to claim 4 wherein, said aromatic substituted hydrazone is selected from the group consisting of 2-hydroxy-1-naphthaldehyde-p-(t-butyl)-benzoyl hydrazone, 2-hydroxy-1-naphthaldehyde-o-aminobenzoyl hydrazone, and mixtures thereof.

6. An article capable of inhibiting the formation of images produced when a dithiooxamide containing color-forming compound comes in contact with a color-developing coreactant, comprising a dithiooamide containing color-forming compound and an effective image-offset controlling amount of an aliphatic tertiary amine selected from the group consisting of trilaurylamine, tributyl amine, and mixtures thereof, carried on a solid substrate such that when said dithiooxamide color-forming compound comes in contact with said aliphatic tertiary amine a loose association is formed.

7. An article according to claim 6 wherein said color-forming compound is selected from the group consisting of N,N'-dibenzyl dithiooxamide, N,N'-dioctanoyl oxyethyl dithiooxamide, aromatic substituted hydrazone of the formula

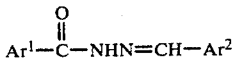

wherein $Ar^1$ and $Ar^2$ are independently selected aromatic substituents, $Ar^1$ being selected from the group consisting of phenyl, substituted phenyl and substituted naphthyl, and $Ar^2$ being selected from the group consisting of o-hydroxy phenyl, substituted o-hydroxy phenyl and o-hydroxy naphthyl, and mixtures thereof.

8. An article according to claim 6 wherein said solid substrate is a paper sheet.

9. An article according to claim 7 wherein said solid substrate is an absorbent ribbon.

10. An article according to claim 7 wherein said solid substrate is a porous pad.

11. An article for dispensing a color-forming composition comprising:

(a) a carrier carrying therewith pressure rupturable microcapsules containing color-forming compound and cosolvent therefor, wherein said color-forming compound comprises dithiooxamide, and (b) overcoating the capsules a coating of an image-offset control agent in cosolvent, said image-offset control agent being an aliphatic tertiary amine capable of forming associations with said color-forming compound and selected from the group consisting of trilaurylamine, tributyl amine and mixtures thereof.

12. A system for providing visible markings comprising:

(a) an article for dispensing a first color-forming composition comprising a carrier carrying therewith a color-forming composition comprising a dithiooxamide containing color-forming compound, and an image-offset control agent in an amount sufficient to reduce image-offsetting, said image-offset control agent being an aliphatic tertiary amine selected from the group consisting of trilaurylamine, tributyl amine and mixtures thereof, and said image-offset control agent being capable of forming an association with said dithiooxamide containing color-forming compound (b) a paper substrate having on at least a portion of the obverse surface a second complementary, color-forming composition comprising a transition metal salt of a carboxylic acid, and (c) transfer means for transferring said first color-forming composition to selected areas of the obverse surface of said paper substrate.

13. A system according to claim 12 wherein said article is adjacent the obverse surface of said paper substrate and said transfer means is an impact printing device adapted to strike said article thereby causing localized transfer of said first color-forming composition to selected portions of the obverse surface of said paper substrate.

14. A system according to claim 12 wherein said transfer means is a portion of the human body.

15. An article capable of inhibiting the formation of images produced when a color-forming compound comes in contact with a color-developing coreactant, comprising a substrate carrying (a) a dithiooxamide containing color-forming compound capable of forming colored complexes with transition metal salts, (b) an effective image-offset controlling amount of an aliphatic tertiary amine selected from the group consisting of trilaurylamine, tributyl amine, and mixtures thereof, and (c) a liquid cosolvent vehicle.

16. An article capable of inhibiting the formation of images produced when a color-forming compound comes in contact with a color-developing coreactant, comprising (a) a transition metal salt containing color-developing coreactant capable of forming colored complexes with a dithiooxamide containing color-forming compound, and (b) an effective image-offset controlling amount of an aliphatic tertiary amine selected from the group consisting of trilaurylamine, tributyl amine, and mixtures thereof, carried on a solid substrate wherein said color-developer and said aliphatic tertiary amine are carried on mutually exclusive areas of said substrate.

* * * * *